United States Patent
Aggarwal et al.

(10) Patent No.: US 11,500,939 B2
(45) Date of Patent: Nov. 15, 2022

(54) UNIFIED FRAMEWORK FOR MULTI-MODAL SIMILARITY SEARCH

(71) Applicant: Adobe Inc., San Jose, CA (US)

(72) Inventors: Pranav Vineet Aggarwal, San Jose, CA (US); Ali Aminian, San Jose, CA (US); Ajinkya Gorakhnath Kale, San Jose, CA (US); Aashish Kumar Misraa, San Jose, CA (US)

(73) Assignee: Adobe Inc., San Jose, CA (US)

( * ) Notice: Subject to any disclaimer, the term of this patent is extended or adjusted under 35 U.S.C. 154(b) by 211 days.

(21) Appl. No.: 16/854,697

(22) Filed: Apr. 21, 2020

(65) Prior Publication Data

US 2021/0326393 A1   Oct. 21, 2021

(51) Int. Cl.
| | |
|---|---|
| *G06F 7/00* | (2006.01) |
| *G06F 16/903* | (2019.01) |
| *G06N 20/00* | (2019.01) |
| *G06F 16/908* | (2019.01) |
| *G06K 9/62* | (2022.01) |

(52) U.S. Cl.
CPC ...... *G06F 16/90344* (2019.01); *G06F 16/908* (2019.01); *G06F 16/90348* (2019.01); *G06K 9/6276* (2013.01); *G06N 20/00* (2019.01)

(58) Field of Classification Search
CPC . G06N 20/00; G06F 16/90348; G06F 16/908; G06K 9/6276
USPC ........................................ 707/736, 737, 758
See application file for complete search history.

(56) References Cited

U.S. PATENT DOCUMENTS

| | | | |
|---|---|---|---|
| 2012/0117051 A1 | 5/2012 | Liu et al. | |
| 2017/0061250 A1* | 3/2017 | Gao | ..................... G06N 3/0454 |
| 2019/0114362 A1 | 4/2019 | Subbian et al. | |
| 2020/0082212 A1* | 3/2020 | Alcock | ................. G06F 16/784 |
| 2021/0158176 A1* | 5/2021 | Wan | ..................... G06F 16/3347 |

OTHER PUBLICATIONS

1st Examination Report in Australian Patent Application No. 2021201044. 7 pages.
Xie, H., Zhang, Y., Tan, J., Guo, L., & Li, J. (2014). Contextual query expansion for image retrieval. IEEE Transactions on Multimedia, 16(4), 1104-1114.
Duong, C. T., Yin, H., Hoang, D., Nguyen, M. H., Weidlich, M., Nguyen, Q. V. H., & Aberer, K. (Apr. 2020). Graph embeddings for one-pass processing of heterogeneous queries. In 2020 IEEE 36th International Conference on Data Engineering (ICDE) (pp. 1994-1997). IEEE.

(Continued)

*Primary Examiner* — Md I Uddin
(74) *Attorney, Agent, or Firm* — Shook, Hardy & Bacon L.L.P.

(57) ABSTRACT

Technology is disclosed herein for enhanced similarity search. In an implementation, a search environment includes one or more computing hardware, software, and/or firmware components in support of enhanced similarity search. The one or more components identify a modality for a similarity search with respect to a query object. The components generate an embedding for the query object based on the modality and based on connections between the query object and neighboring nodes in a graph. The embedding for the query object provides the basis for the search for similar objects.

20 Claims, 13 Drawing Sheets

(56) References Cited

OTHER PUBLICATIONS

Hsu, W. H., Kennedy, L. S., & Chang, S. F. (Sep. 2007). Video search reranking through random walk over document-level context graph. In Proceedings of the 15th ACM international conference on Multimedia (pp. 971-980).
Ly, Q., N., et al., "Hierarchical Data Model in Content-based Image Retrieval", International Journal of Information Technology, vol. 12, No. 5, retrieved from Internet URL : http://intjit.org/cms/journal/volume/12/5/125_1.pdf, pp. 1-10 (2006).
Wu, F., et al., "Sparse Multi-Modal Hashing", IEEE Transactions on Multimedia, vol. 16, No. 2, pp. 427-439 (Feb. 2014).
Zhai, X., et al., "Heterogeneous Metric Learning with Joint Graph Regularization for Cross-Media Retrieval", Proceedings of the Twenty-Seventh AAAI Conference on Artificial Intelligence, Institute of Computer Science and Technology, pp. 1198-1204 (Jul. 2013).
Second Examination Report received for Australian Patent Application No. 2021201044, dated Feb. 17, 2022, 6 pages.

* cited by examiner

UNIFIED FRAMEWORK FOR MULTI-MODAL SIMILARITY SEARCH

TECHNICAL FIELD

Aspects of the disclosure are related to the field of computing hardware, software, and services, and in particular, to similarity search technology.

BACKGROUND

Similarity search generally functions by comparing the similarity between pairs of objects. For example, a dataset may be searched for the top k objects most similar to a query object based on a comparison of each object in the set to the query object. The unique pairs of objects, comprised of the query object and each object in the set, may thus be evaluated based on the similarity of the target object in a given pair to the query object. The similarity of one object to another may be evaluated based on visual similarity, conceptual similarity, or any other modality, and the search pipeline can be optimized for any desired modality.

The search pipeline broadly includes a feature extraction stage—or embedding—followed by an evaluation stage. The features of a query object are extracted during the first stage and are supplied as input to the evaluation stage. At the evaluation stage, the features of the query object are compared to those of the target objects to find the most similar objects. Feature extraction can be weighted toward one dimension or another, depending upon the chosen optimization, as can feature evaluation. A search for the most visually similar objects to a query object may be optimized for the visual features of the objects, for instance, whereas a search for conceptually similar objects may be optimized for conceptual (or textual) features.

A downside to existing optimization techniques is that a similarity search focused on one modality or dimension tends to miss out on objects that might be similar in other modalities. Another downside—at least with respect to search solutions that employ machine learning models—is that separate models are needed for each type of optimization. That is, two models optimized for different modalities would each be trained on different datasets in order to produce the desired optimizations. Present optimizations therefore lack fine-grained control over similarity aspects and also lack extensibility with respect to adding new modalities. Such constraints make search optimizations a cumbersome endeavor, especially with respect to those that employ machine learning models.

Machine learning models may be employed in the context of similarity search in one or both of the feature extraction stage and the evaluation stage. During feature extraction, a query object may be input to a model that produces an embedding for the object. The embedding may then be passed to any type of search tool—whether it utilizes a machine learning model or a traditional rules-based approach. The search tool compares the embedding for the query object to the embedding for the objects in the target dataset to identify and return those considered to be the top k most similar objects in the set.

Some solutions produce the embedding for a query object using a model trained on a graph of existing objects (e.g. GraphSAGE). The graph, which includes nodes and edges representative of the objects and their interconnections, takes the query object as input and produces an embedding for the object as output. The embedding can then be passed to a search tool to find its k nearest neighbors in the set of existing objects. The model can be optimized for one modality or another by selecting training data that emphasizes the one modality or the other. Unfortunately, this technique requires a different model for each optimization, as discussed above, and is neither readily explainable nor extensible.

In a brief example, a set of existing images may be queried to find images similar to a query image. In order to search the existing images, a graph is utilized to train a machine learning model on node embeddings. The graph includes nodes representative of the images and edges representative of their connections. For instance, images may be connected to other images in the set that are similar to a given image. Images of cats would be connected to other images of cats; images of dogs would be connected to other images of dogs; images of cats and dogs would be connected to images of cats and images of dogs; and so on.

The nodes include embeddings—or feature vectors—that encode information about each image. The machine learning model is trained on the graph to generate embeddings for new input images: the trained model takes query images as input and produces embeddings for the images as output. The embedding for a given query image may then be used in a similarity search of the dataset to find those images similar to the query image. Unfortunately, once a model has been trained, its modality cannot be changed, and the model will always generate embeddings in accordance with the single modality for which it was trained.

BRIEF SUMMARY

A unified framework for similarity search is disclosed herein that allows multiple modalities to be modeled jointly such that the dimension to be emphasized in a search may be chosen on a per-search basis. Such a framework may be extended to any number of dimensions and the control over modality selection may be explicit, implicit, or otherwise. The modality selected for a given search influences one or both of: which edges of a query object to input to a model that produces an embedding for the object; and a weighting to apply to the embedding. The resulting embedding purposefully biases the similarity search toward the desired modality.

In various implementations, a search environment includes one or more computing hardware, software, and/or firmware components in support of enhanced similarity search. In operation, the one or more components identify a modality for a similarity search with respect to a query object. The components generate an embedding for the query object based on the modality and based on connections between the query object and neighboring nodes in a graph. The embedding for the query object provides the basis for the search for similar objects.

In some implementations, the graph is used to train a machine learning model that produces the embedding for the query object. The embedding produced by the model may be biased by the input supplied to it. In some cases, the one or more components selectively identify which edges to include with the query object in the input to the model in order to bias the resulting embedding toward one of multiple possible modalities. The embedding output by the model may be provided to a search component to find the similar objects.

In the same or other implementations, the output obtained from the machine learning model may be considered an initial embedding for the query object. The initial embedding may be combined with a tag embedding into a combined embedding that is input to the similarity search. The initial embedding and the tag embedding may be combined based on a weighting specified by the modality such that the combined embedding is biased toward the selected modality, thereby influencing the final results of the search.

This Brief Summary is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
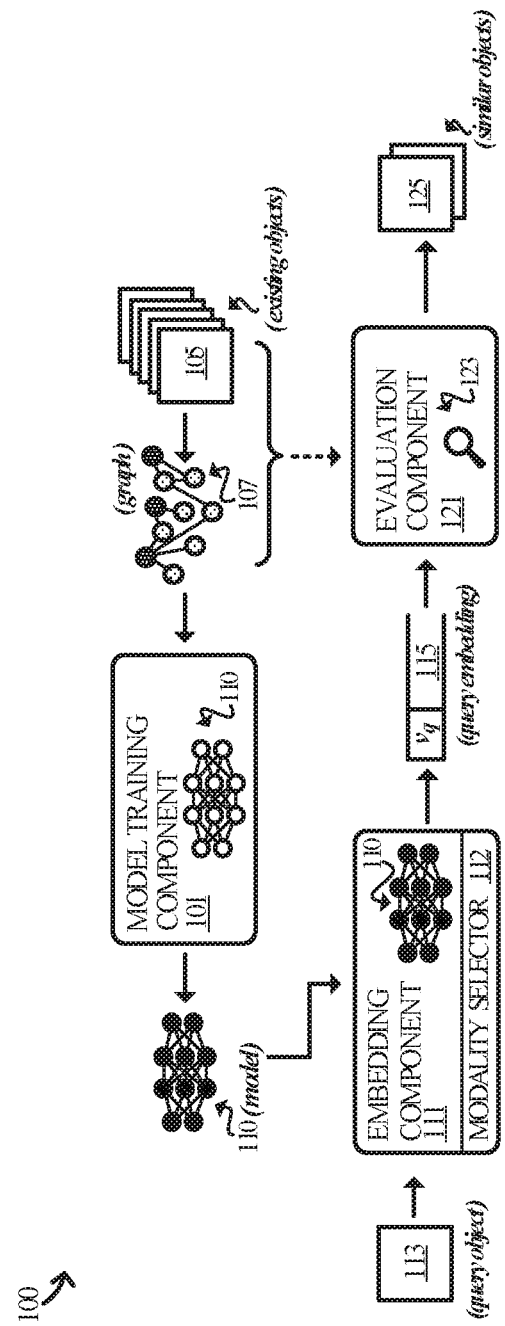
FIG. 1 illustrates a search environment in an implementation.

Optimizing similarity search for a desired modality is a notoriously difficult problem to solve in representation learning, especially with respect to visual search. Optimizing for just visual similarity produces results that lack diversity with respect to conceptual similarity, just as optimizing for conceptual similarity produces results lacking in visual similarity. In addition, optimizing a similarity search for one modality over another limits or inhibits entirely the explanatory value and capabilities of the results. It is also very difficult to add new dimensions to present similarity search frameworks.

The unified framework disclosed herein proposes representation learning on a multi-modal graph that includes objects and their meta data (tags) together. The graph may be jointly modeled in at least two modalities (e.g. visual and conceptual) such that the resulting model may produce embeddings in accordance with multiple modalities. In addition, an inference edge connection provides explanatory value and control over which dimension to choose for a similarity search—e.g. visual or conceptual. The control may be implicit based on user intent such as search queries, or explicit using a user interface to accept modality selections. Selectively identifying connections to the graph provide the ability to control the mode of a search.

The dimensions need not be limited to visual or conceptual, but rather are extendable to any dimensions supported by available meta data or machine learning inferences in the graph structure. In addition, the unified framework is applicable to a variety of data including images, documents, video, biological structures, chemical structures, and the like.

In various implementations disclosed herein, a graph is proposed that comprises a combination of nodes of different modalities and edges between them to establish association. Examples include objects, object tags, and connections determined base on similarity. The graph connects each object with its corresponding tags and the k nearest neighbors of a given object. The tags may be part of an object (e.g. text embedded in an image) or they may comprise short sequences of words that describe the contents of an object.

The k nearest neighbors for an object are determined based on a similarity score for a first dimension (ranked closest first, hence "nearest") of all the objects in the corpus to a query object. An example dimension is the "visual" similarity of images determined by an independent deep neural network trained and optimized for representation learning of images in a high-dimensional space where similarity may be captured through a distance metric (with the closest in distance being more similar). A visual similarity metric for neighbor edges in the graph is just one example of how the framework is generalizable to any similarity metric between nodes of same type or between different node types.

Once the multi-modal graph has been built, a model is trained on the graph for the purpose of converting each node into embeddings (feature vectors) which contain information of one dimension (e.g. visual) and information of at least a second dimension (e.g. conceptual) which is extracted by the graph connections. In some implementations, the object nodes in the graph are initialized with ResNet-18 features which are of the size 512. The tag nodes are randomly initialized with tag embeddings of the size 512. The training seeks to reduce the distance between the node embeddings which are directly connected and increase the distance between the ones that are more than one hop away. The trained model may then be deployed in the support of joint representation learning. That is, the model may be used for similarity searches of any of the multiple modalities for which it was trained.

The model may be employed for at least two different purposes. In one, the model may be used to predict tags for query objects. Using images as an example, a given query image is connected to its top k images in the graph based on least distances. The query image and its connections are then input to the model to generate an embedding for the query node. The top k tags may then be found based on the least distance between the query node embedding and the tag embeddings for the tags in the graph.

The model may also be employed in object search and retrieval. A first methodology utilizes object-object connections when there are no tags available for the query objects. In such instances, the query object is connected to its top k closest objects in the graph to generate a new query embedding. Similar objects may then be found based on a least-distance comparison of the query object embedding to the object embeddings in the graph.

In a variation, object-tag nodes may be utilized in addition to object-object nodes. A query object is again connected to its top k objects in the graph, but also to its corresponding tag nodes in the graph. A new query embedding is produced based on the query object, its object-object connections, and its object-tag connections. The resulting query embedding may be used to find the top k similar objects in the graph. In an alternative, the object-tag nodes may be used exclusively to generate the new query embedding.

Figure 8:
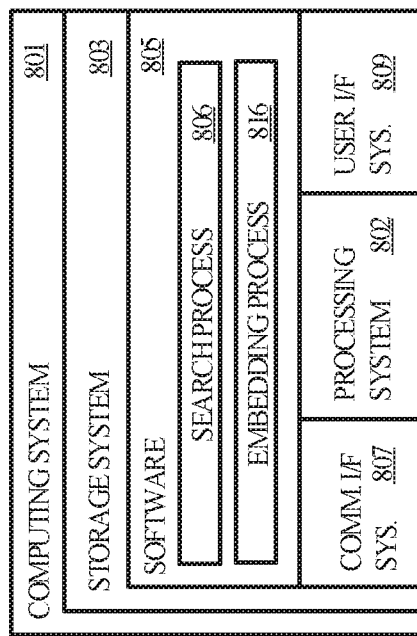
FIG. 8 illustrates a computing system suitable for implementing the various operational environments, modules, architectures, processes, scenarios, and sequences discussed below with respect to the Figures.

FIG. 1 illustrates a search environment 100 in an implementation of a unified framework for multi-mode similarity search. Search environment 100 includes a model training component 101, an embedding component 111, and an evaluation component 121. Model training component 101, embedding component 111, and evaluation component 121 function together to provide enhanced similarity search capabilities. Search environment 100 may be implemented in hardware, software, and/or firmware, and in the context of on one or more computing systems, of which computing system 801 in FIG. 8 is representative.

Broadly speaking, search environment 100 takes query objects as input, of which query object 113 is representative, and identifies a number of objects similar to query object 113, of which search results 125 are representative. Search environment 110 accomplishes this task by leveraging a joint model, represented by model 110, trained on a graph 107 to produce embeddings for query objects, represented by query embedding 115.

More specifically, model training component 101 trains model 110 jointly on graph 107, which includes nodes and edges corresponding to a dataset 105 of existing objects, tags, and their connections. Examples of the existing objects include, but are not limited to, images, documents, video, audio, molecules, and proteins. The tags comprise textual descriptions or labels for at least some of the objects. In a set of images, for instance, the tags may label the scenes or content in the individual images, whereas in a set of documents, the tags may describe the type of documents in the set.

The nodes in graph 107 correspond to the objects and tags, and the edges in graph 107 correspond to their connections. Object pairs that are sufficiently similar to each other are connected by an edge, while objects that have been labeled may be connected by an edge to a tag node. While some objects may be connected to one or more tags, a given object need not be connected to any tags at all, although each object is connected to at least one other object by an edge. Whether two objects are sufficiently similar to be connected is a matter of design based on empirical evidence and may be considered outside the scope of the present disclosure. In some cases, the graph 107 already exists and its construction need not be a concern. In addition to the nodes and edges, the graph 107 also includes embeddings (feature vectors) that encode information for each object and tag. The existing embeddings may also be ascertained a-priori and, together with the nodes and edges, comprise the training data for training model 110.

Model training component 101 trains model 110 jointly on the graph 107 and its embeddings associated with dataset 105. The model 110 is shown in its untrained state in model training component 101 (represented by no fill color) and in its trained state (represented by black fill) in embedding component 111. Model 110 may comprise one or more artificial neural networks composed of layers of neurons. The layers are connected to each other in various ways and the neurons fire in response to various inputs. The inputs at the first layer are the data being analyzed (e.g. graph 107).

The outputs at the final layer represent what the neural network has learned or recognized (e.g. embeddings). In between are intermediate or "hidden" layers that perform additional processing.

Each neuron has a rule that tells the neuron to fire (or not) based on its input. The inputs are weighted, and the weights may be changed based on a feedback process. In the case of graph data, the inputs to the first layer of the artificial neural network(s) are vectors populated with numerical or symbolic descriptions of the nodes and edges in the graph representative of the objects, tags, and connections in the existing dataset. The inputs to the hidden layers are the outputs of the neurons in the first layer. Within the hidden layers, the outputs from one layer are the inputs to a subsequent layer. The last layer of the artificial neural network takes the output of the last hidden layer as input and itself outputs values that identify what was learned as the signals passed through the various layers of neurons.

During the training phase of a neural network, the weights associated with the neurons are changed based on the difference between the outcome produced by the neural network and the correct embedding for the input to the neural network. Over time, and after many cycles of feedback, the weights are configured such that the neural network may accurately produce embeddings for new objects. The final configuration of the weights and neurons is considered a model of the subject matter being examined, such as objects and their embeddings.

Embedding component 111 utilizes model 110 in its trained state to generate embeddings for query objects such as query object 113. Embedding component 111 includes a modality selector 112 comprising a sub-component capable of determining the modality for a search, which factors into how embedding component 111 produces the embeddings. Modality selector 112 may determine the modality explicitly (e.g. from user input or other such instructions), implicitly, or otherwise. The resulting query embedding 115 comprises numerical and/or symbolic information having characteristics of query object 113 encoded therein.

Embedding component 111 passes the query embedding 115 to evaluation component 121 to serve as input to a search tool 123. Search tool 123 searches a dataset for objects similar to query object 113 by comparing query embedding 115 to the embeddings for the objects in the dataset. Search tool 123 may employ a machine learning approach to find the similar objects, a rules-based approach, a combination of the two, or any other type of search technology capable of leveraging query embedding 115. The target dataset may be dataset 105 and its embeddings, although it would be possible to search datasets other than dataset 105. The output of evaluation component 121 comprises one or more objects, represented by similar objects 125 which, as mentioned, may be drawn from dataset 105.

Figure 2:
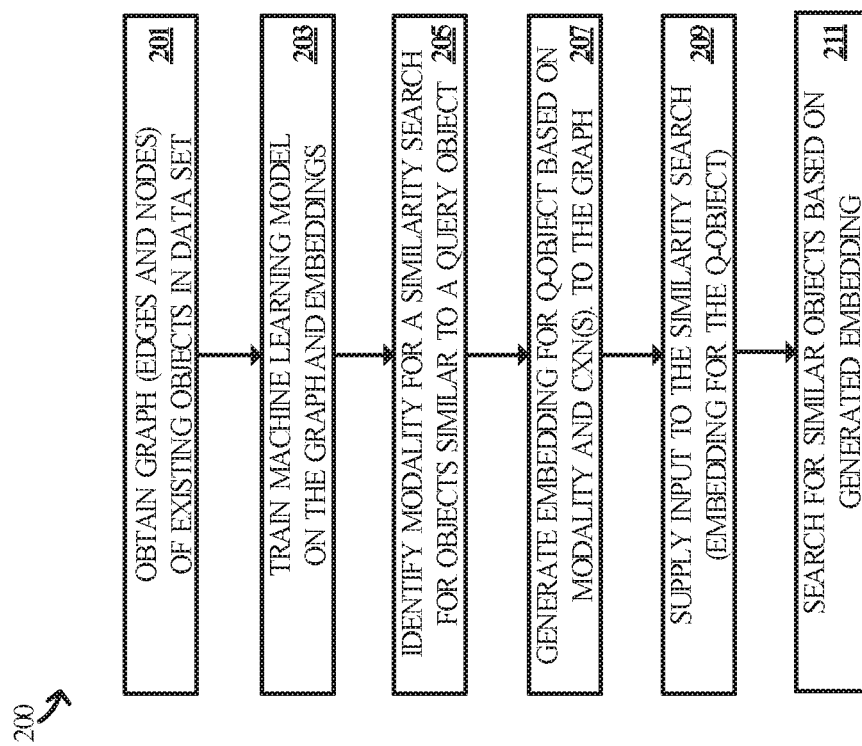
FIG. 2 illustrates a search process in an implementation.

In order to achieve the enhanced similarity search discussed above, the one or more computing systems that provide search environment 100 execute search process 200 in the context of the components of search environment 100. Search process 200, illustrated in FIG. 2, may be implemented in program instructions in the context of any of the hardware, software applications, modules, or other such programming elements that comprise model training component 101, embedding component 111, and evaluation component 121. The program instructions direct their host computing system(s) to operate as described for search process 200, referring parenthetically to the steps in FIG. 2.

In operation, search process 200 obtains a graph of the existing objects in a dataset (step 201). The graph includes nodes and edges that correspond to the objects and tags in the dataset, as well as their interconnections. Search process 200 then proceeds to train a machine learning model on the graph and embeddings for the objects in the graph (step 203). The embeddings may be included in the graph, although they may also be provided separately.

Next, search process 200 identifies a modality for a similarity search of the objects in the graph with respect to a query object (step 205). Examples of the query object include images, documents, proteins, and other such objects for which embeddings may be created. As such, examples of the dataset to be searched include image repositories, document repositories, protein repositories, and the like. The modality may be selected from a range of possible modalities that differ from each other with respect to how they influence the embedding generated for a given query object. More specifically, at least one of the possible modalities will encode the connections of query objects to tags in its resulting embeddings to a greater degree than the other modalities, some of which may ignore the object-tag connections entirely.

For example, with respect to image data, the modality may be selected from at least a visual modality and a conceptual modality. The visual modality would bias the embedding toward visual characteristics or attributes of the query object, whereas the conceptual modality would bias the embedding toward conceptual characteristics or attributes of the query object. Examples of visual characteristics include—but are not limited to—spectral mean, spectral minimum, spectral maximum, and so on. Examples of conceptual attributes relate to the connection(s) between the query image and one or more tags in the dataset, since the tags describe the content of the images to which they are connected.

A similar concept applies to documents, proteins, and other searchable objects. For example, documents could also be searched via a visual modality that emphasizes visual attributes of a query document more so than when a conceptually oriented modality is used. When the conceptual modality is used, the embeddings produced for query documents would have their document-tag connections encoded more strongly than that achieved by other modalities—especially those that ignore document-tag connections entirely.

It may be appreciated that visual modalities are merely one example of a variety of possible modalities. Other examples include content-based modalities that consider attributes of the content (words, phrases, etc.) contained in a document or other such object, or attributes of the chemical composition of molecules or materials of objects being searched. Regardless, the signature difference between any two modalities is that one is capable of encoding the object-tag connections of a query object to a greater degree than the other.

The identified modality need not be an either-or choice. Rather, the identified modality could reside anywhere on a spectrum of modalities. The modality could be determined by user input comprising a selection of a modality from a set of possible modalities in a user interface. Alternatively, the user input could be a position on a sliding scale between two modalities (e.g. a "slider" that may be positioned anywhere between two different modalities).

With the modality identified, search process 200 proceeds to generate an embedding for the query object based on the identified modality and the query object's connections to the graph (step 207). The connections to the graph may include one or both of object-object connections and object-tag connections. The connections may optionally include connections between the query object and other types of nodes that may be included in the graph in addition to the object nodes and the tag nodes.

The resulting embeddings may be biased toward a selected modality in a number of ways. In some implementations, the bias is accomplished by selecting certain ones of the query object's connections to the graph over others. For instance, a visual search would select object-object connections and would ignore or reduce object-tag connections. In contrast, a conceptual search would include more object-tag connections than the visual search. In a sliding scale example, the resulting modality would include object-tag connections to a greater degree the closer the user input positions a slider near to a pure conceptual search, and to a lesser degree (if at all) the further away the slider is position from the conceptual search.

In other implementations, the embeddings may be biased in a different manner whereby an initial embedding is generated for a query object and is then combined with an embedding generated for an associated tag. The combination of the initial embedding with the tag embedding results in the embedding for the query object and the combining step may be weighted based on the determined modality. For example, the weighting may emphasize or favor the tag embedding for conceptual modalities, while de-emphasizing the tag embedding for less-conceptual modalities (e.g. visual modalities). The sliding scale concept may also be utilized in such embodiments. In a sliding scale implementation, the weighting would weigh the tag embedding to a greater degree the closer the user input positions the slide toward one end representing the conceptual modality. The further away the slider is positioned from the conceptual modality, the less weight would be given to the tag embedding on a relative basis.

Search process 200 takes the resulting embedding for the query object and supplies it as input to a similarity search function (step 209). The similarity search function may be, for example, a k-nearest neighbors search that compares the query embedding the embeddings for the objects in the target dataset. The similarity search function may utilize a machine learning approach, a rules-based approach, or any combination or variation thereof to search for objects similar to the query object based on their embeddings (step 211). The results of the search may be returned to whichever application, service, or component initially requested the search.

Applying search process 200 to the elements of search environment 100, the components of search environment 100 perform as follows. It may be appreciated that, while the steps of search process 200 may be ascribed to specific components in search environment 100, they may be performed by one or more of the components illustrated in FIG. 1, as well as other components not shown or those that are external to search environment 100.

In operation, model training component 110 obtains graph 107 of the existing objects in dataset 105. Graph 107 includes nodes and edges that correspond to the objects and tags in the dataset, as well as their interconnections. Model training component 101 then proceeds to train model 110 on the graph and embeddings for the objects in the graph and model 110 in its trained state is provided to embedding component 111.

A similarity search is then initiated with respect to query object 113. Modality selector 112 determines the modality for the search, which informs how embedding component 111 generates the embeddings for query object 113. The modality may be determined explicitly, implicitly, or otherwise, and from a set of possible modalities, a range, or otherwise.

Embedding component 111 proceeds to generate the embeddings for the query object by one or a combination of possible paths. In some scenarios, embedding component 111 selectively identifies connections between the query object and other objects in the graph based on the determined modality. The query object and its connections are then input to model 110 to produce output comprising the query embedding 115. In a brief example, embedding component 111 may include object-object connections and object-tag connections in accordance with some modalities, while excluding or limited object-tag connections in other modalities.

In other scenarios, embedding component 111 may generate an initial embedding for the query object in accordance with any modality. As with the scenario discussed immediately above, embedding component 111 supplies the query object and at least some of its connections to model 110 to produce the initial embedding. The initial embedding is then combined with a tag embedding generated for a tag associated with the query object. Query embedding 115 in this scenario is the result of the combination of the initial embedding with the tag embedding. The tag embedding may be known a-priori or may also be generated by model 110.

In either case, query embedding 115 is submitted to evaluation component 121. Evaluation component 121 provides query embedding 115 as input to a search function 123 which may compare query embedding to the embeddings associated with dataset 105, whether using a machine learning approach, a rules-based approach, or any other type of search. The results output by search function 123 the top-k objects considered to be most similar to the query object 113 in view of the modality of the search. The results may be, for example, images similar to a query image, documents similar to a query document, or proteins similar to a query protein.

Figure 3:
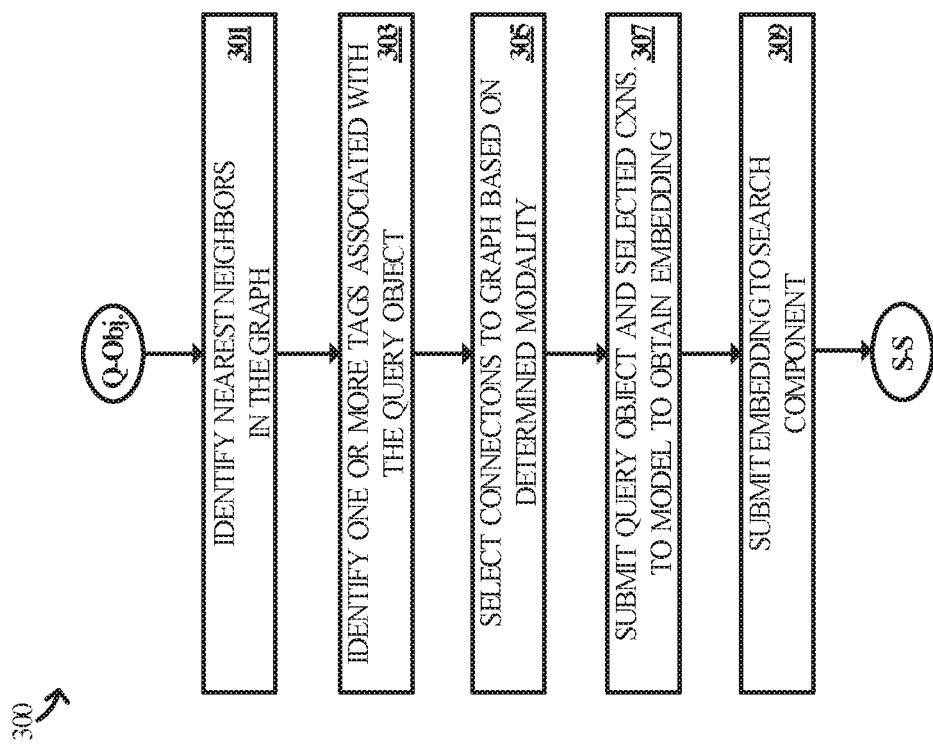
FIG. 3 illustrates an embedding process in an implementation.

FIG. 3 illustrates an embedding process 300 in an implementation of enhanced similarity search. Embedding process 300 may in some implementations be employed in the context of search process 200. In addition, embedding process 300 may be implemented in program instructions in the context of any of the hardware, software applications, modules, or other such programming elements that comprise a search environment, such as search environment 100. The program instructions direct their host computing system(s) to operate as described for embedding process 300, referring parenthetically to FIG. 3.

In operation, embedding process 300 obtains, receives, or otherwise identifies a query object such as an image, a document, a protein, and the like. The query object comprises the subject of a similarity search of a dataset that includes other objects. It is assumed for exemplary purposes that a graph of the existing objects in the dataset exists, and that the graph includes edges and nodes representing the objects and their connections. The dataset also includes embeddings for the objects. It is further assumed that the graph and embeddings have been used to train a model capable of generating new embeddings for query objects.

Embedding process 300 proceeds to identify the top-k nearest neighbors in the graph to the query object (step 301). In some embodiments, the nearest neighbor search may comprise a visual similarity search of the objects in the dataset based on a neural network, distinct from the model trained for embedding, where the neural network is trained and optimized for representation of learning in a high dimensional space. Similarity may thus be captured in a distance metric that may be evaluated to find the nearest neighbors. While visual similarity is discussed herein, any type of similarity between two nodes may be evaluated instead, whether between nodes of the same type or between nodes of different types.

Embedding process 300 also identifies one or more tags associated with the object (step 303). Examples of tags include one or more words that may be part of an object, such as words embedded in an image or included in a document, words in meta data associated with an image or document, or any other type of description or identifying words about an object. Embedding process 300 (or an associated process) may also identify the tag(s) by applying a text recognition algorithm or other suitable tools with respect to the object. Alternatively, the object may have been pre-processed or labeled ahead of time such that its tags are already known to embedding process 300.

Next, embedding process 300 selects connections to the graph, between the query object and the nodes in the graph, based on the modality identified for the similarity search (step 305). Embedding process 300 starts with all the object-object connections between the query object and its top-k nearest neighbors in the graph, as well as the object-tag connections between the query object tags in the graph similar to the query object's description. Then, depending on the modality chosen for the search, some of the object-tag connections may be excluded from the connections. For instance, for a purely visual search, all of the object-tag connections may be excluded, while all of the object-tag connections may be included for a highly conceptual search.

Embedding process 300 submits the query object and its selected connections to the model, to obtain an embedding for the query object (step 307). Submitting the query object to the model may comprise providing the query object itself to an interface to the model which may then transform the query object into a vector representation suitable for the model. Similarly, the selected connections may also be submitted via an interface such that the model and/or its environment may transform the connections into a vector representation. Alternatively, embedding process 300 or a sub-process could transform the query object and the selected connections into a vector representation suitable for inputting to the model.

The model takes the query object and selected connections as input and produces output comprising an embedding (feature vectors) for the query object. Because the model had been jointly trained on both visual data and conceptual data (tags), the resulting embedding may have both visual and conceptual information encoded therein, the degree to which depends on the chosen modality for the search. A more visual search will give less weight to the conceptual information, whereas a more conceptual search will give greater weight to the conceptual information. This is accomplished in Step 307 above where the object-tag connections are either included or excluded to a degree determined by the modality.

Embedding process 300 submits the generated embedding to a similarity search component to obtain results comprising objects in the dataset similar to the query object (step 309). The results are returned and may include one or more objects found to be similar to the query object on a visual basis, a conceptual basis, or a combination thereof.

Figure 4A:
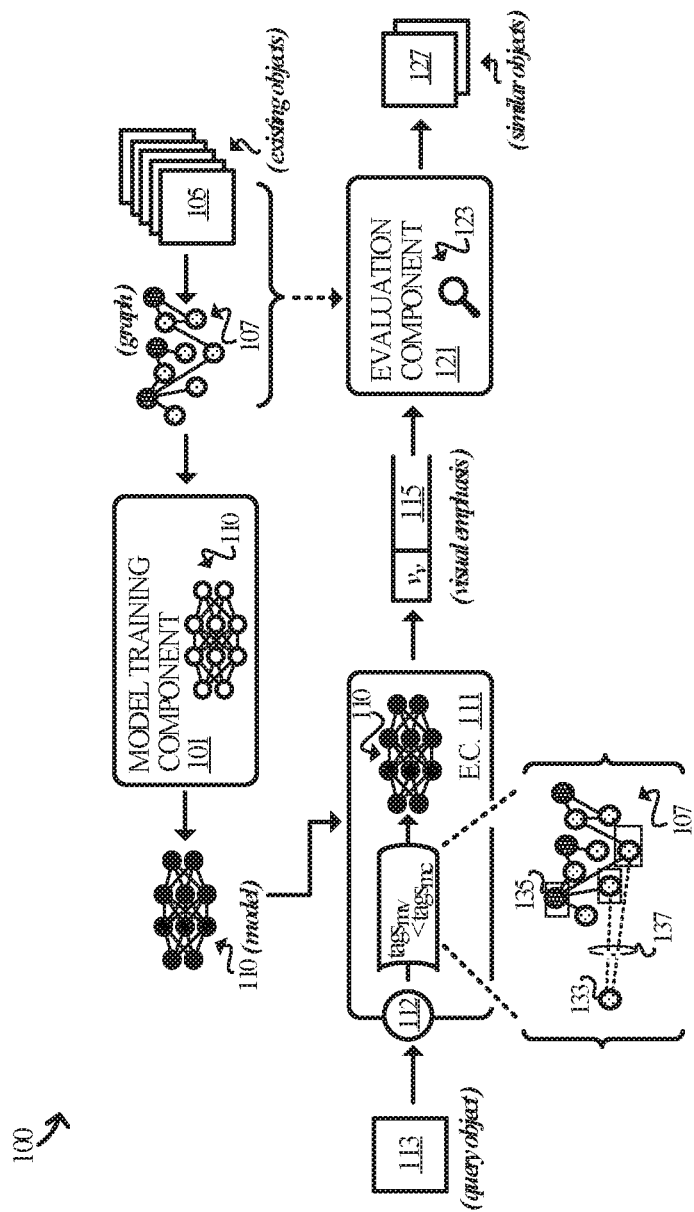
FIGS. 4A-4B illustrate a search environment in an implementation and two operational scenarios respectively.
Figure 4B:
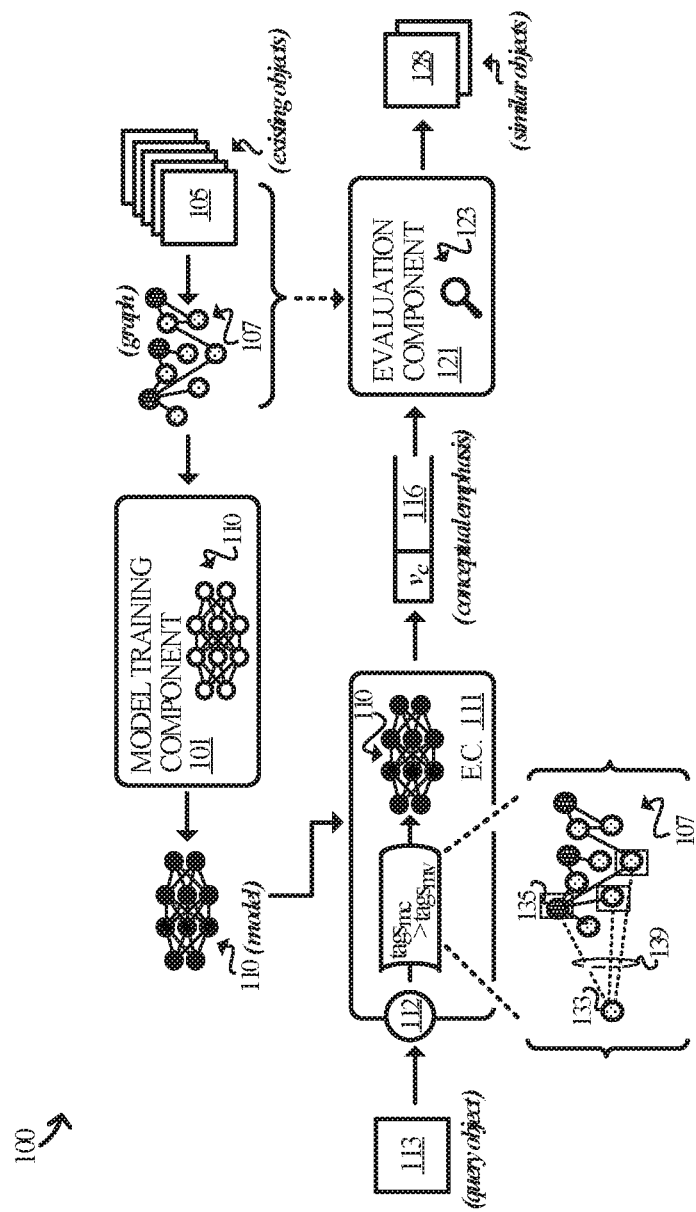

FIGS. 4A-4B illustrate two different applications of embedding process 300 to the elements of search environment 100. It may be appreciated that, while the steps of embedding process 300 may be ascribed to specific components in search environment 100, they may be performed by one or more of the components illustrated in FIG. 4, as well as other components not shown or not included in search environment 100.

FIG. 4A illustrates an exemplary search scenario in which the chosen modality comprises a visual modality, as opposed to a conceptual modality, which is illustrated in FIG. 4B and discussed below. In FIG. 4A, model training component 110 obtains graph 107 of the existing objects in dataset 105. As mentioned, graph 107 includes nodes and edges that correspond to the objects and tags in the dataset, as well as their interconnections. In this example, the tag nodes in graph 107 are represented by those with a darker fill than other nodes, while the object nodes are represented by those with the relatively lighter fill color. Model training component 101 trains model 110 on the graph and embeddings for the objects in the graph such that model 110 may be provided in its trained state embedding component 111.

A similarity search is then initiated with respect to query object 113. Modality selector 112 determines the modality for the search, which informs how embedding component 111 generates the embeddings for query object 113. The modality may be determined explicitly, implicitly, or otherwise, and from a set of possible modalities, a range, or otherwise. It is assumed for exemplary purposes that query object 113 is an image and the determined modality is a visual modality.

Embedding component 111 proceeds to generate the embeddings for the query object, beginning with identifying the top-k nearest neighbors in the graph to the query object. The nearest neighbor search may comprise a visual similarity search of the objects in the dataset based on a neural network, although other search methodologies may be utilized. While visual similarity is discussed herein, any type of similarity between two nodes may be evaluated instead, whether between nodes of the same type or between nodes of different types. The top-k nodes in the graph 107 are highlighted by rectangles enclosing the nodes, which include two object nodes. Embedding component 111 also identifies one or more tags associated with the object represented in this example by tag node 135, which is also enclosed by a rectangle.

Examples of tags include one or more words that may be part of an object, such as words embedded in an image or included in a document, words in meta data associated with an image or document, or any other type of description or identifying words about an object. Embedding process 300 (or an associated process) may identify the tag(s) by applying a text recognition algorithm or other suitable tools with respect to the object. Alternatively, the object may have been pre-processed or labeled ahead of time such that its tags are already known to embedding component 111.

Next, embedding component 111 selectively identifies connections between the query object and other objects in the graph based on the determined modality. Embedding component 111 determines to connect query object 111 to its nearest neighbors in the graph 107, excluding tag nodes in accordance with the visual modality. In other words, the visual modality in this example puts a smaller emphasis on tag nodes than would a conceptual modality, as represented by the expression: $tags_{mv} < tags_{mc}$. Node 113, which represents query object 111 in the graph, is therefore connected to two object nodes in the graph by edges 137, whereas tag node 135 is excluded from the group of connections.

The query object and its connections, which notably lack any object-tag connections, are then input to model 110 to produce output comprising the query embedding 115. Internal to model 110, because it had been jointly trained on object-object nodes and object-tag nodes alike, the resulting embedding may have some object-tag information encoded therein. However, the resulting embedding is likely to have less such information encoded therein than had the input include one or more object-tag connections.

Put another way, the influence of the object-tag connections between the query object 113 and tag nodes in graph 107 is less when no object-tag connections are included in the input relative to when one or more such connections are included. This statement necessarily means that the object-object connections have more influence on the resulting embedding when zero object-tag connections are included and have relatively less influence when object-tag connections are included in the input. Importantly, model 110 is able to respond to either extreme—when zero object-tag connections are included and when many object-tag connections are included—because it has been jointly trained on graph 107. Model 110 is also able to respond to intermediate cases where one or more object-tag connections are included in the input data. A technical effect of such flexibility is the ability of any user, upstream application, component, or service to determine on a per-search basis which modality to use, without having to change, swap, or retrain models, nor having to maintain multiple models.

Once generated, query embedding 115 is submitted to evaluation component 121. Evaluation component 121 provides query embedding 115 as input to a search function 123 which may compare query embedding to the embeddings associated with dataset 105, whether using a machine learning approach, a rules-based approach, or any other type of search. The results output by search function 123 are the top-k objects considered to be most similar to the query object 113 in view of the modality of the search. The results 127 may be, for example, images similar to a query image, documents similar to a query document, video clips similar to a query video, or proteins similar to a query protein.

In FIG. 4B, model training component 110 again obtains the graph 107 of the existing objects in dataset 105. The tag nodes in graph 107 are represented by those with a darker fill than other nodes, while the object nodes are represented by those with the relatively lighter fill color. Model training component 101 trains model 110 on the graph and embeddings for the objects in the graph such that model 110 may be provided in its trained state embedding component 111.

A similarity search is then initiated with respect to query object 113. Modality selector 112 determines the modality for the search, which informs how embedding component 111 generates the embeddings for query object 113. The modality may be determined explicitly, implicitly, or otherwise, and from a set of possible modalities, a range, or otherwise. It is assumed for exemplary purposes that query object 113 is an image and the determined modality is a conceptual modality, as opposed to the visual modality illustrated in FIG. 4A.

Embedding component 111 proceeds to generate the embeddings for the query object, beginning with identifying the top-k nearest neighbors in the graph to the query object. The nearest neighbor search may comprise a visual similarity search of the objects in the dataset based on a neural network, although other search methodologies may be utilized. While visual similarity is discussed herein, any type of similarity between two nodes may be evaluated instead, whether between nodes of the same type or between nodes of different types. The top-k nodes in the graph 107 are identified by rectangles enclosing the nodes, which include two object nodes. Embedding component 111 also identifies one or more tags associated with the object represented in this example by tag node 135, which is also enclosed by a rectangle.

Examples of tags include one or more words that may be part of an objects, such as words embedded in an image or included in a document, words in meta data associated with an image or document, or any other type of description or identifying words about an object. Embedding process 300 (or an associated process) may identify the tag(s) by applying a text recognition algorithm or other suitable tools with respect to the object. Alternatively, the object may have been pre-processed or labeled ahead of time such that its tags are already known to embedding component 111.

Next, embedding component 111 selectively identifies connections between the query object and other objects in the graph based on the determined modality. Embedding component 111 determines to connect query object 111 to its nearest neighbors in the graph 107, as well as to one or more tag nodes in accordance with the conceptual modality. In other words, the conceptual modality in this example puts a greater emphasis on tag nodes than does the visual modality, as represented by the expression: $tags_{mc} > tags_{mv}$. Node 113, which represents query object 111 in the graph, is therefore connected to two object nodes in the graph and one tag node by edges 139.

The query object and its connections, which notably include an object-tag connection, are then input to model 110 to produce output comprising the query embedding 116. Internal to model 110, because it had been jointly trained on object-object nodes and object-tag nodes alike, the resulting embedding may have some object-tag information encoded therein and is likely to have more of such information encoded therein than had the input excluded all object-tag connections.

Stated differently, the influence of the object-tag connections between the query object 113 and tag nodes in graph 107 is greater when at least one object-tag connection is included in the input relative to when no such connections are included. This statement necessarily means that the object-tag connections have more influence on the resulting embedding when one or more object-tag connections are included and have relatively less influence when fewer (or no) object-tag connections are included in the input. As mentioned, model 110 is able to respond to either extreme as well as to intermediate cases because it has been jointly trained on graph 107. As was also mentioned, a technical effect of such flexibility is the ability of any user, upstream application, component, or service to determine on a per-search basis which modality to use, without having to change, swap, or retrain models, nor having to maintain multiple models.

Once generated, query embedding 116 is submitted to evaluation component 121. Evaluation component 121 provides query embedding 115 as input to a search function 123 which may compare query embedding to the embeddings associated with dataset 105, whether using a machine learning approach, a rules-based approach, or any other type of search. The results output by search function 123 are the top-k objects considered to be most similar to the query object 113 in view of the modality of the search. The results 128 may be, for example, images similar to a query image, documents similar to a query document, video clips similar to a query video, or proteins similar to a query protein.

Figure 5:
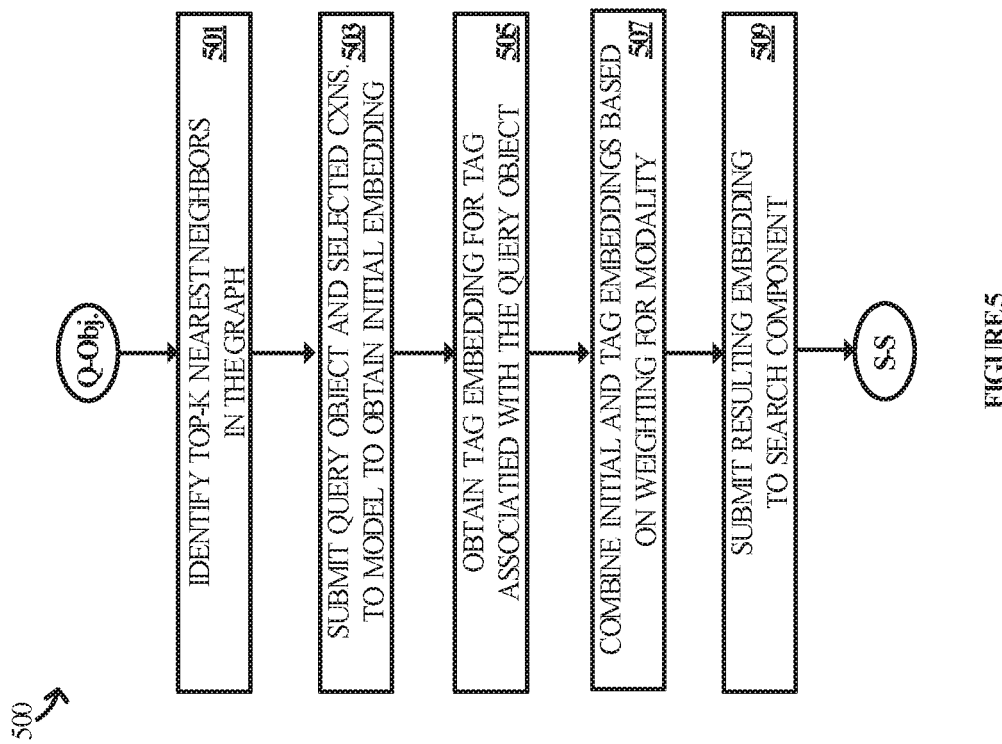
FIG. 5 illustrates an embedding process in an implementation.

FIG. 5 illustrates an embedding process 500 in another implementation of enhanced similarity search. Embedding process 500 may in some implementations be employed in the context of search process 200. In addition, embedding process 500 may be implemented in program instructions in the context of any of the hardware, software applications, modules, or other such programming elements that comprise a search environment, such as search environment 100. The program instructions direct their host computing system(s) to operate as described for embedding process 500, referring parenthetically to FIG. 5.

In operation, embedding process 500 obtains, receives, or otherwise identifies a query object such as an image, a document, a protein, and the like. The query object comprises the subject of a similarity search of a dataset that includes other objects. It is assumed for exemplary purposes that a graph of the existing objects in the dataset exists, and that the graph includes edges and nodes representing the objects and their connections. The dataset also includes embeddings for the objects. It is further assumed that the graph and embeddings have been used to train a model capable of generating new embeddings for query objects.

Embedding process 500 proceeds to identify the top-k nearest neighbors in the graph to the query object (step 501). In some embodiments, the nearest neighbor search may comprise a visual similarity search of the objects in the dataset based on a neural network, distinct from the model trained for embedding, where the neural network is trained and optimized for representation of learning in a high dimensional space. Similarity may thus be captured in a distance metric that may be evaluated to find the nearest neighbors. While visual similarity is discussed herein, any type of similarity between two nodes may be evaluated instead, whether between nodes of the same type or between nodes of different types.

Embedding process 500 may also identify one or more tags associated with the object. Examples of tags include one or more words that may be part of an objects, such as words embedded in an image or included in a document, words in meta data associated with an image or document, or any other type of description or identifying words about an object. Embedding process 500 (or an associated process) may identify the tag(s) by applying a text recognition algorithm or other suitable tools with respect to the object. Alternatively, the object may have been pre-processed or labeled ahead of time such that its tags are already known to embedding process 500.

Next, embedding process 500 submits the query object and its selected connections to the model, to obtain an embedding for the query object (step 503). Submitting the query object to the model may comprise providing the query object itself to an interface to the model which may then transform the query object into a vector representation suitable for the model. Similarly, the selected connections may also be submitted via an interface such that the model and/or its environment may transform the connections into a vector representation. Alternatively, embedding process 500 or a sub-process could transform the query object and the selected connections into a vector representation suitable for inputting to the model.

It may be appreciated that the connections may include only object-object connections or a mix of object-object connections and object-tag connections. It may be appreciated that embedding process 500 could optionally include the steps of selecting the connections based on the determined modality for the similarity search as described with respect to FIG. 3 above. For instance, for a purely visual search, all of the object-tag connections may be excluded, while one or more object-tag connections may be included for a conceptual search.

The model takes the query object and selected connections as input and produces output comprising an initial embedding (feature vectors) for the query object. Because the model had been jointly trained on both visual data and conceptual data (tags), the initial embedding may have both visual and conceptual information encoded therein, the degree to which depends on whether object-tag connections are included in the input.

Embedding process 500 also obtains a tag embedding for the tag associated with the object (step 505). The tag embedding may be known beforehand or embedding process 500 may generate the tag embedding at runtime. Embedding process 500 then combines the initial embedding with the tag embedding based on a weighting specified by the determined modality for the search (step 507). The resulting query embedding is therefore a weighted combination of the initial embedding and the tag embedding. The weighting may influence the combination to encode more of the tag embedding into the query embedding for conceptual modalities relative to visual modalities, for example.

Lastly, embedding process 500 submits the query embedding to a similarity search component to obtain results comprising objects in the dataset similar to the query object (step 509). The results are returned and may include one or more objects found to be similar to the query object on a visual basis, a conceptual basis, or a combination thereof.

Figure 6A:
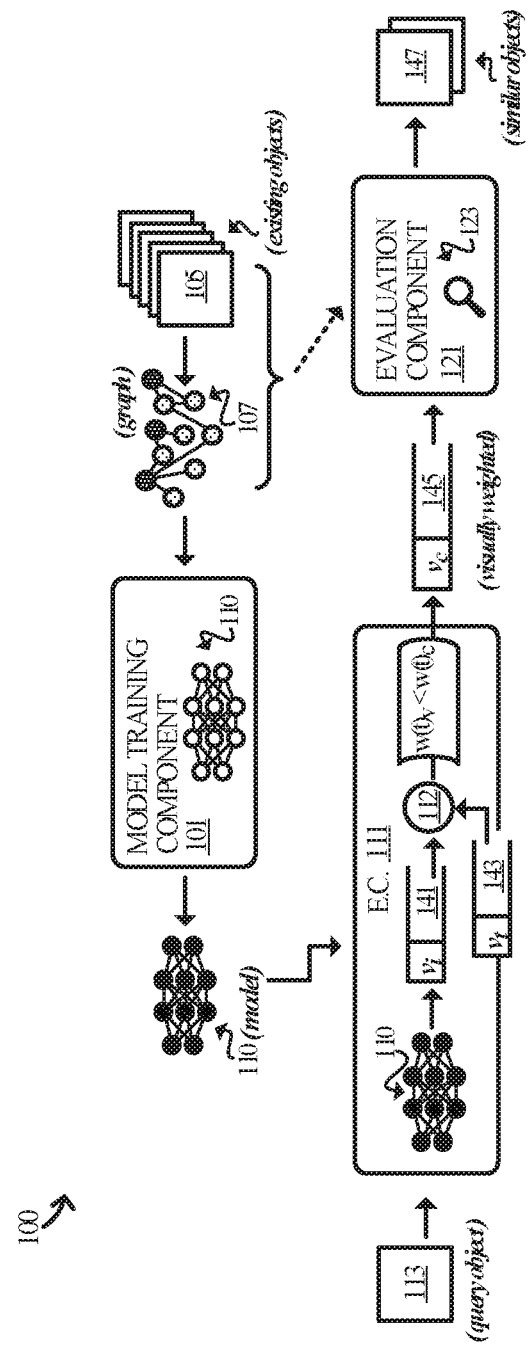
FIGS. 6A-6B illustrate a search environment in an implementation and two operational scenarios respectively.
Figure 6B:
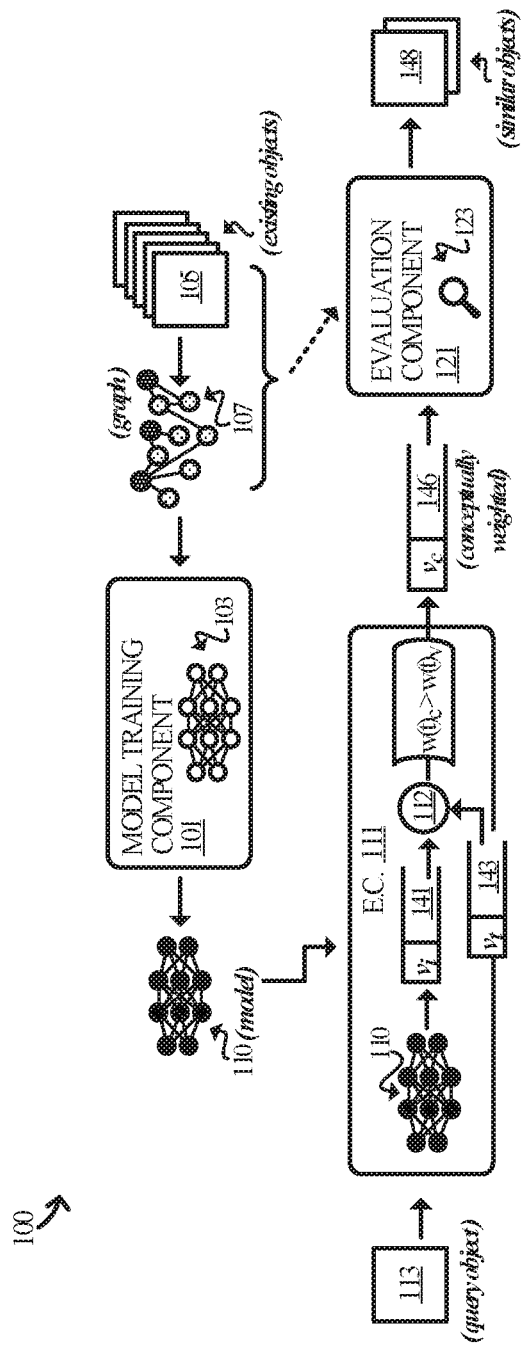

FIG. 6A illustrates an application of embedding process 300 in an exemplary search scenario in which the chosen modality comprises a visual modality, as opposed to a conceptual modality, which is illustrated in FIG. 6B and discussed below. In FIG. 6A, model training component 110 obtains graph 107 of the existing objects in dataset 105. Graph 107 again includes nodes and edges that correspond to the objects and tags in the dataset, as well as their interconnections. Model training component 101 trains model 110 on the graph and embeddings for the objects in the graph such that model 110 may be provided in its trained state embedding component 111.

A similarity search is then initiated with respect to query object 113. Embedding component 111 proceeds to generate the embeddings for the query object, beginning with identifying the top-k nearest neighbors in the graph to the query object. The nearest neighbor search may comprise a visual similarity search of the objects in the dataset based on a neural network, although other search methodologies may be utilized. While visual similarity is discussed herein, any type of similarity between two nodes may be evaluated instead, whether between nodes of the same type or between nodes of different types. Embedding component 111 also identifies one or more tags associated with the object. Examples of tags include one or more words that may be part of an objects, such as words embedded in an image or included in a document, words in meta data associated with an image or document, or any other type of description or identifying words about an object.

Embedding component 111 identifies connections between the query object and other objects in the graph. In some implementations, embedding component 111 identifies the connections on the same basis regardless of the determined modality by, for example, selecting all of the connections to all of the top-k similar objects. In other implementations, embedding component 111 could selectively choose connections based on the determined modality as discussed above with respect to FIG. 3.

The query object and its connections are then input to model 110 to produce output comprising an initial embedding 141. Embedding component 111 combines the initial embedding 141 with a tag embedding 143 based on a weighting specific to the modality determined for the search by modality selector 112. In the case of a visual search, the modality gives greater weight to the initial embedding 141 produced by model 110 than it otherwise would in the context of a conceptual search as represented by the expression: $w(t)_v < w(t)_c$. Conversely, a conceptual search gives greater weight to the tag embedding than does the visual search. The combined embedding 145 that results therefore has a certain degree of conceptual information encoded therein that depends on how strongly the tag embedding is weighted in the combination. The influence of the tag associated with the query object is therefore greater for conceptual searches than for visual searches. Embedding component 111 is able to respond to either extreme—when zero weighting is given to the tag embedding and when maximum weighting is given to the tag embedding—as well as to intermediate case when a moderate amount of weighting is given to the tag embedding. A technical effect of such flexibility is again the ability of any user, upstream application, component, or service to determine on a per-search basis which modality to use, without having to change, swap, or retrain models, nor having to maintain multiple models.

Once generated, the combined embedding 145 is submitted to evaluation component 121. Evaluation component 121 provides combined embedding 145 as input to a search function 123 which may compare the combined embedding to the embeddings associated with dataset 105, whether using a machine learning approach, a rules-based approach, or any other type of search. The results output by search function 123 are the top-k objects considered to be most similar to the query object 113 in view of the modality of the search. The results 147 may be, for example, images similar to a query image, documents similar to a query document, video clips similar to a query video, or proteins similar to a query protein.

FIG. 6B illustrates an exemplary search scenario in which the chosen modality comprises a conceptual modality, as opposed to a visual modality. In FIG. 6B, model training component 110 obtains the graph 107 of the existing objects in dataset 105. Graph 107 again includes nodes and edges that correspond to the objects and tags in the dataset, as well as their interconnections. Model training component 101 trains model 110 on the graph and embeddings for the objects in the graph such that model 110 may be provided in its trained state embedding component 111.

A similarity search is then initiated with respect to query object 113. Embedding component 111 proceeds to generate the embeddings for the query object, beginning with identifying the top-k nearest neighbors in the graph to the query object. The nearest neighbor search may comprise a visual similarity search of the objects in the dataset based on a neural network, although other search methodologies may be utilized. While visual similarity is discussed herein, any type of similarity between two nodes may be evaluated instead, whether between nodes of the same type or between nodes of different types. Embedding component 111 also identifies one or more tags associated with the object. Examples of tags include one or more words that may be part of an objects, such as words embedded in an image or included in a document, words in meta data associated with an image or document, or any other type of description or identifying words about an object.

Embedding component 111 identifies connections between the query object and other objects in the graph. In some implementations, embedding component 111 identifies the connections on the same basis regardless of the determined modality by, for example, selecting all of the connections to all of the top-k similar objects. In other implementations, embedding component 111 could selectively choose connections based on the determined modality as discussed above with respect to FIG. 3.

The query object and its connections are then input to model 110 to produce output comprising an initial embedding 141. Embedding component 111 combines the initial embedding 141 with a tag embedding 143 based on a weighting specific to the modality determined for the search by modality selector 112. In the case of a conceptual search, the modality gives less weight to the initial embedding 141 produced by model 110 than it otherwise would in the context of a visual search as represented by the expression: $w(t)_c > w(t)_v$. In other words, a conceptual search gives greater weight to the tag embedding than does the visual search. The combined embedding 146 that results therefore has a certain degree of conceptual information encoded therein that depends on how strongly the tag embedding is weighted in the combination.

Once generated, the combined embedding 146 is submitted to evaluation component 121. Evaluation component 121 provides combined embedding 146 as input to a search function 123 which may compare the combined embedding to the embeddings associated with dataset 105, whether using a machine learning approach, a rules-based approach, or any other type of search. The results output by search function 123 are the top-k objects considered to be most similar to the query object 113 in view of the modality of the search. The results 148 may be, for example, images similar to a query image, documents similar to a query document, video clips similar to a query video, or proteins similar to a query protein.

FIGS. 7A-7D illustrate an operational scenario 700 in a highly simplified example implementation of enhanced similarity search as proposed herein. Operational scenario 700 begins with an existing graph 710 of objects, tags, and their connections. The existing graph 710 comprise nodes representative of images in a dataset and tags that are descriptive of cohorts of the images. For example, the nodes include image nodes 701, 703, 705, 709, 711, 715, 719, and 721. The nodes also include tag nodes 707, 713, and 717.

In a pre-processing step, certain pairs of nodes have been connected by edges based on their similarity and/or applicability. For instance, image node 701 is connected to image node 703 by edge 704 because both are images of one or more cats. In turn, image node 701 is connected to tag 707 by edge 708, and image node 703 is also connected to tag node 707 by edge 706, because tag node 707 includes the description "cat."

Tag node 707 is also connected to image node 705 because it too includes a cat in its image. However, image node 705 was not considered sufficiently similar to either image node 701 or image node 703 to be connected. Image node 705 is connected to image node 709 by edge 714 because both include images of a toaster. Image node 709 is connected to tag 722 because tag 722 includes the description "toaster," although image node 705 is not. In addition, image node 709 connects to image node 711 by edge 720, although image node 711 does not connect to tag node 713.

Image node 715 of a dog and cat is connected to both image node 703 and tag node 717 by edge 718 and edge 724 respectively. Tag node 717 is further connected to image node 719 and image node 721 by edge 726 and edge 728 respectively.

The reasons why some image nodes may be connected to each other, while not connected to others, may include a variety of factors that are generally outside the scope of the present disclosure. However, one reason is that graphs can be built differently and in view of different judgements or thresholds relative to each other. This leads to different conclusions under different circumstances about which nodes should be connected by edges. Thus, image node 701 in this example may be connected to image node 703, while not to image node 705, even though both include cats. Likewise, with respect to image nodes 715, 721, and 719, even though all three include images of dogs.

In the same vein, many factors may influence why some image nodes are connected to a tag node, while other image nodes are not, or why image nodes related to seemingly similar images are not connected to the same tags. For example, image node 711 corresponds to an image of a toaster, but it is not connected to tag 713. This may be because the image corresponding to image node 711 had no textual data or other such information to allow it to be recognized as a toaster and connected to the tag.

It may therefore be appreciated that most graphs do not (and cannot) perfectly represent the interconnections between the objects and tags in the dataset. Rather, a nearly limitless number of connections are possible based on the wide variety of factors and thresholds that go into determining whether one node should be connected to another. This reality is precisely why the enhanced similarity search disclosed herein provides advantages over the prior art—because it allows the connections in a graph to be jointly represented in a model and then for the model to be leveraged selectively in the direction of one modality or another.

Figure 7A:
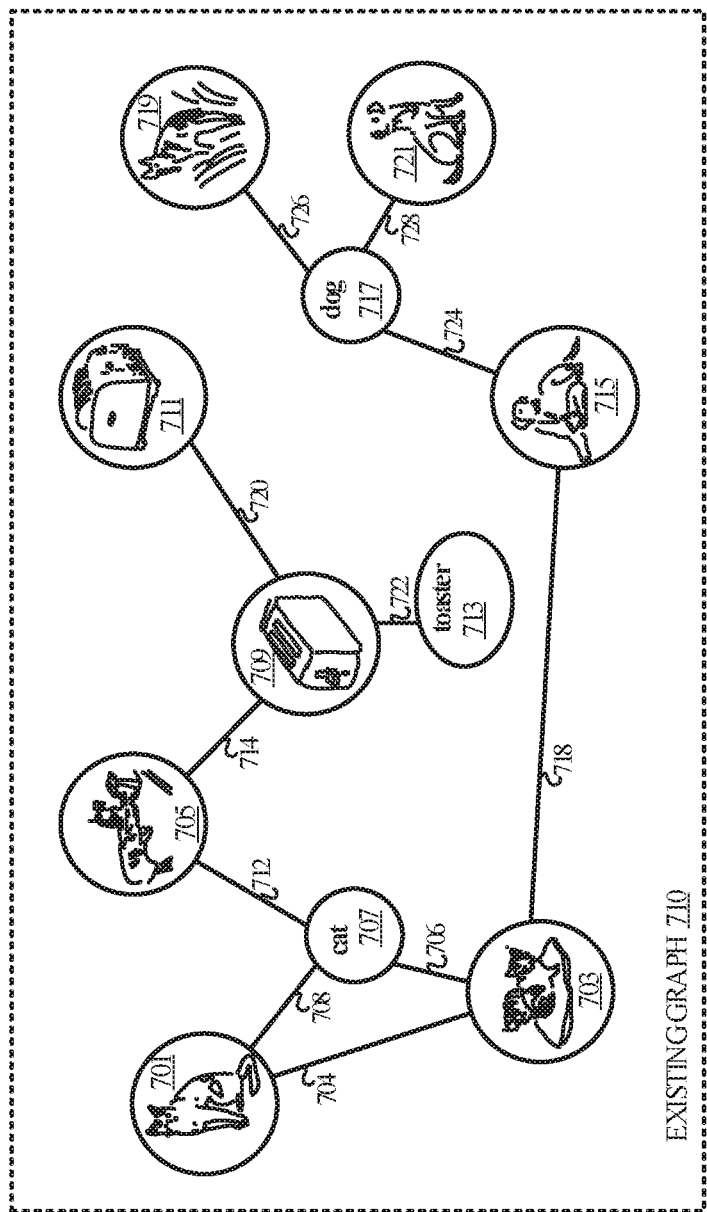
FIGS. 7A-7D illustrate an exemplary similarity search conducted via two different modalities in an implementation.
Figure 7B:
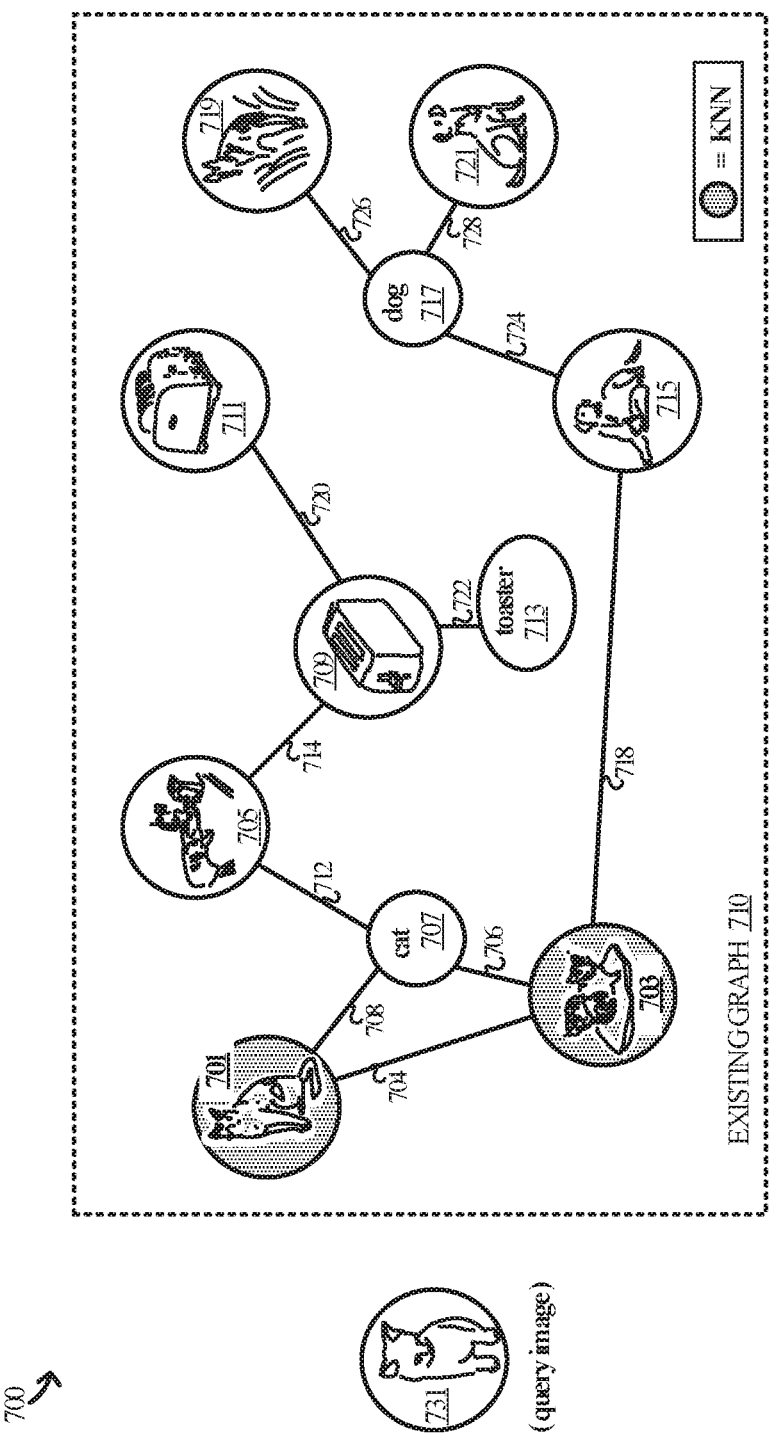

Continuing with operational scenario 700, a query image 731 is provided in FIG. 7B. The query image 731 is ostensibly a cat, and the goal of the similarity search is to find the top-k most similar images in the existing graph 710 based on a chosen modality. A first step is to identify the nearest neighbors in the existing graph 710 to the query image 731 based on an independent similarity search. The search yields image node 701 and image node 703 as the two most similar to query image 713.

Figure 7C:
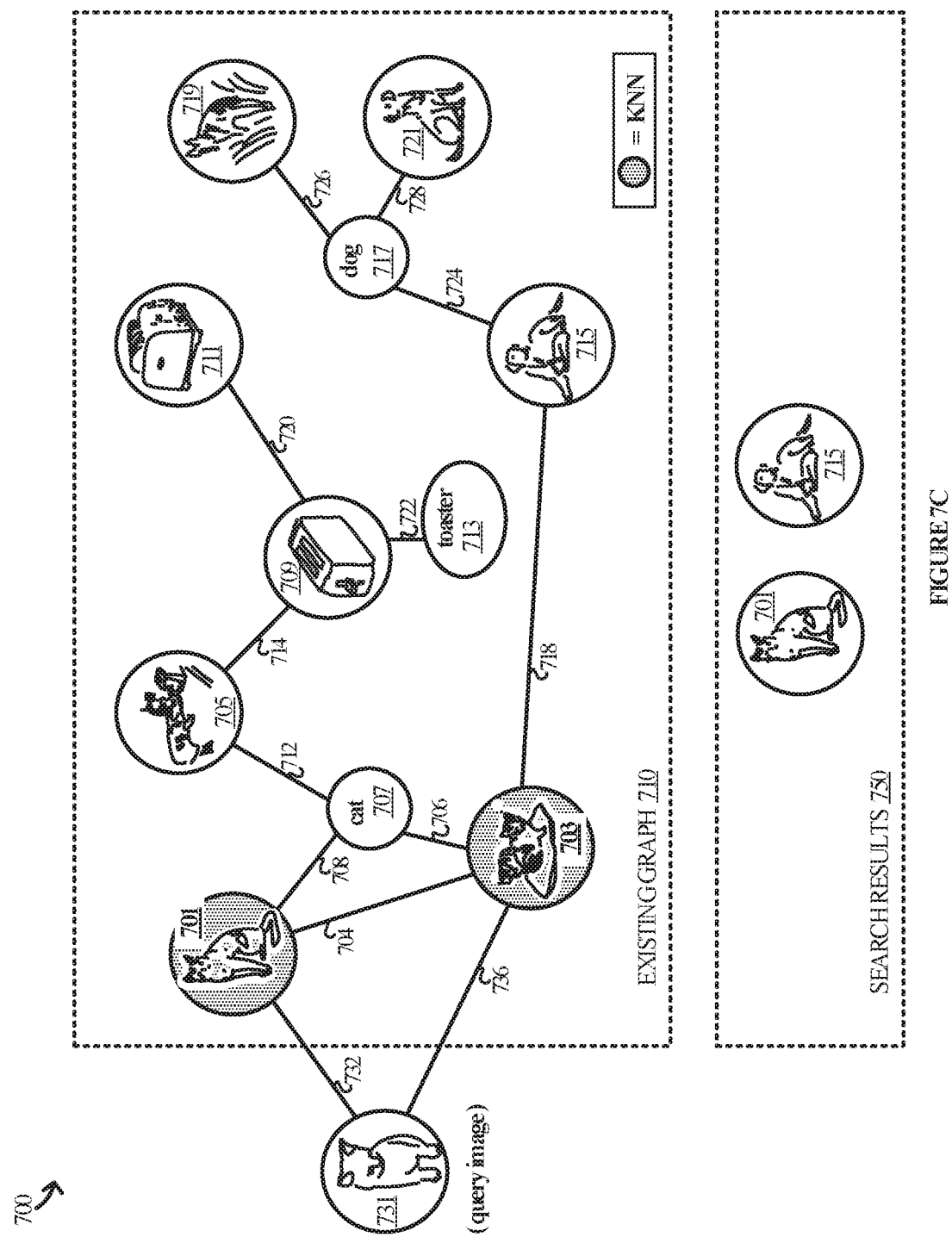

Next, in FIG. 7C, edges between the query image 731 and its nearest neighbors are established in accordance with a visual modality. In accordance with the visual modality in this example, zero object-tag connections are included. Therefore, only edge 732 and edge 736 are included with query image 731 when embeddings are generated for the query image. The embeddings are produced by a machine learning model (e.g. model 110) taking the query image 731 and its edges 732 and 736 as input. The resulting query embedding is then supplied to an evaluation component to identify the most similar images in the graph relative to the query image—and based on their embeddings. The search results 750 include image node 701 and image node 715 as being the most similar on a visual basis to query image 731.

Figure 7D:
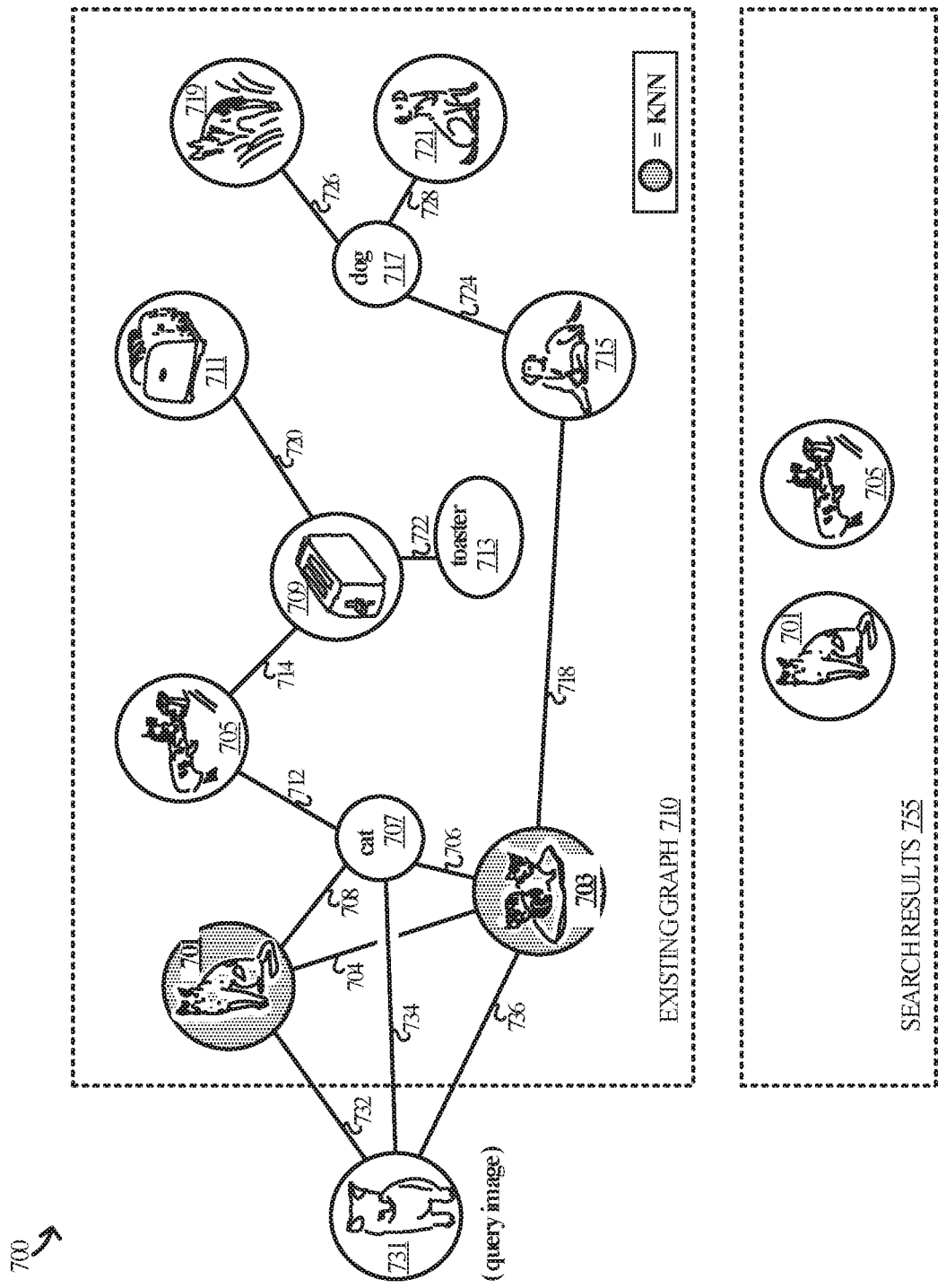

In contrast, FIG. 7D illustrates an example of a conceptual modality. In FIG. 7D, edges between the query image 731 and its nearest neighbors are established in accordance with a visual similarity between them. However, in accordance with the conceptual modality in this example, an edge 734 to tag node 707 is also included. Therefore, edges 732 and 736—as well as edge 734—are included with query image 731 when embeddings are generated for the query image. The embeddings are produced by a machine learning model (e.g. model 110) taking the query image 731 and its edges 732, 734, and 736 as input. The resulting query embedding is then supplied to an evaluation component to identify the most similar images in the graph relative to the query image—and based on their embeddings. The search results 755 include image node 701 and image node 705 as being the most similar on a visual basis to query image 731.

Notably, search results 755 differ from search results 750 because the inputs to the embedding process differ. That is, in FIG. 7C the inputs lack an object-tag edge, whereas the inputs in FIG. 7D include an object-tag edge. In one set (search results 750), the image of the dog associated with image node 715 may be more visually similar to the query image 731 than the image of the cat and toaster associated with image node 705. In the other (search results 755), the image of the cat and toaster replace the image of the dog, perhaps because of its connection to tag node 707. In other words, while the image of the dog curled up with a cat (image node 715) may look more visually similar to computer vision than the image of the cat and toaster, the image of the cat and toaster is conceptually more similar. The enhanced similarity search and unified framework disclosed herein allows a user to explore these different outcomes without the burden of having to retrain, maintain, or replace multiple models.

FIG. 8 illustrates computing system 801 that is representative of any system or collection of systems in which the various components, modules, processes, programs, and scenarios disclosed herein may be implemented. Examples of computing system 801 include, but are not limited to, server computers, cloud computing platforms, and data center equipment, as well as any other type of physical or virtual server machine, container, and any variation or combination thereof. Other examples include desktop computers, laptop computers, tablet computers, Internet of Things (IoT) devices, wearable devices, and any other physical or virtual combination or variation thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements search process 806, which is representative of the search processes discussed with respect to the preceding Figures. Software 805 also includes and implements embedding process 816, which is representative of the embedding processes discussed with respect to the preceding Figures. When executed by processing system 802 to provide enhanced similarity search, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including search process 806 and embedding process 816) may be implemented in program instructions and among other functions may, when executed by processing system 802, direct computing system 801 to operate as described with respect to the various operational scenarios, sequences, and processes illustrated herein. For example, software 805 may include program instructions for implementing enhanced similarity search as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to provide enhanced similarity search. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. One or more computer readable storage media having program instructions stored therein that, when executed by a processing system, direct a computing apparatus to at least:
    determine, selected from a plurality of modalities, a modality for a similarity search to be performed with respect to a query object;
    identify, based on a nearest neighbor search of objects represented in a graph and based on the selected modality for the similarity search, one or more connections between the query object and a subset of the objects in the graph;
    submit input to a machine learning model, wherein the input comprises a vector embedding of the query object and the one or more connections between the query object and the subset of the objects;
    obtain output from the machine learning model, wherein the output comprises an initial vector embedding for the query object;
    obtain a tag vector embedding for at least one tag associated with the query object;
    combine the initial vector embedding and the tag vector embedding, to produce a combined vector embedding, based on a weighting biased towards the selected modality; and
    supply input to the similarity search comprising the combined vector embedding for the query object, to obtain results comprising one or more similar objects represented in the graph.

2. The one or more computer readable storage media of claim 1 wherein:
    when the selected modality comprises a conceptual modality, the weighting emphasizes the tag vector embedding in the combining of the initial vector embedding with the tag vector embedding, more so than when the selected modality comprises a visual modality; and
    when the selected modality comprises the visual modality, the weighting emphasizes the tag vector embedding in the combining of the initial vector embedding with the tag vector embedding, less so than when the selected modality comprises the conceptual modality.

3. The one or more computer readable storage media of claim 1 wherein:
    the query object comprises a query image;
    the objects comprise existing images represented by nodes in the graph; and
    the one or more similar objects represented in the graph comprise nearest neighbors of the query image in the existing images.

4. The one or more computer readable storage media of claim 3, wherein the program instructions, when executed by the processing system, further direct the computing apparatus to perform the similarity search, for the nearest neighbors of the query image in the existing images, based on the combined vector embedding.

5. The one or more computer readable storage media of claim 1, wherein the graph comprises:
    the existing nodes, wherein existing nodes comprise object nodes corresponding to the objects and tag nodes corresponding to tags; and
    existing edges representative of existing connections, wherein the existing connections comprise object-object connections between similar pairs of the objects, and object-tag connections between the tags and at least some of the objects.

6. The one or more computer readable storage media of claim 1, wherein the program instructions, when executed by the processing system, further direct the computing apparatus to:
    identify a subset of the objects most like the query object; and
    identify one or more tags associated with the subset of the objects; and
    include, in the one or more connections, one or more of new object-object connections between the query object and the subset of the objects, and one or more new object-tag connections between the query object and the one or more tags.

7. The one or more computer readable storage media of claim 6, wherein:
    when the selected modality comprises a visual modality, the one or more connections include the new object-object connections and exclude the one or more new object-tag connections; and when the selected modality comprises a conceptual modality, the one or more connections include one or more of the new object-object connections and the one or more of the new object-tag connections.

8. The one or more computer readable storage media of claim 1, wherein the program instructions, when executed by the processing system, further direct the computing apparatus to identify the selected modality based on user input comprising a selection of the selected modality from a set of possible modalities comprising a visual modality and a conceptual modality.

9. A method comprising:
determining a modality, selected from a plurality of modalities, for a similarity search to be performed with respect to a query object;
identifying, based on a nearest neighbor search of objects represented in a graph and based on the selected modality determined for the similarity search, one or more connections between the query object and a subset of the objects in the graph;
submitting input to a machine learning model, wherein the input comprises a vector embedding of the query object and the one or more connections between the query object and the subset of the objects;
obtaining output from the machine learning model, wherein the output comprises an initial vector embedding for the query object;
obtaining a tag vector embedding for at least one tag associated with the query object;
combining the initial vector embedding and the tag vector embedding, to produce a combined vector embedding, based on a weighting biased towards the selected modality; and
supplying input to the similarity search comprising the combined vector embedding for the query object, to obtain results comprising one or more similar objects represented in the graph.

10. The method of claim 9, wherein the selected modality comprises a conceptual modality, and the weighting emphasizes the tag vector embedding in the combining of the initial vector embedding with the tag vector embedding.

11. The method of claim 9, wherein the selected modality comprises a visual modality, and the weighting emphasizes the tag vector embedding in the combining of the initial vector embedding with the tag vector embedding.

12. The method of claim 9, wherein:
the query object comprises a query image;
the objects comprise existing images represented by nodes in the graph; and
the one or more similar objects represented in the graph comprise nearest neighbors of the query image in the existing images.

13. The method of claim 12, further comprising performing the similarity search, for the nearest neighbors of the query image in the existing images, based on the combined vector embedding.

14. The method of claim 12, wherein the graph comprises:
the existing nodes, wherein existing nodes comprise object nodes corresponding to the objects and tag nodes corresponding to tags; and
existing edges representative of existing connections, wherein the existing connections comprise object-object connections between similar pairs of the objects, and object-tag connections between the tags and at least some of the objects.

15. The method of claim 12, further comprising:
identifying a subset of the objects most like the query object; and
identifying one or more tags associated with the subset of the objects; and
including, in the one or more connections, one or more of new object-object connections between the query object and the subset of the objects, and one or more new object-tag connections between the query object and the one or more tags.

16. The method of claim 15, wherein the selected modality comprises a visual modality, and the one or more connections include the new object-object connections and exclude the one or more new object-tag connections.

17. The method of claim 15, wherein the selected modality comprises a conceptual modality, and the one or more connections include one or more of the new object-object connections and the one or more of the new object-tag connections.

18. The method of claim 9, further comprising identifying the selected modality based on user input comprising a selection of the selected modality from a set of possible modalities comprising a visual modality and a conceptual modality.

19. A computing system comprising:
one or more computer readable storage media having program instructions stored therein that, when executed by a processing system, direct a computing apparatus to at least:
determine a modality, selected from a plurality of modalities, for a similarity search to be performed with respect to a query object;
identify, based on a nearest neighbor search of objects represented in a graph and based on the selected modality for the similarity search, one or more connections between the query object and a subset of the objects in the graph;
submit input to a machine learning model, wherein the input comprises a vector embedding of the query object and the one or more connections between the query object and the subset of the objects;
obtain output from the machine learning model, wherein the output comprises an initial vector embedding for the query object;
obtain a tag vector embedding for at least one tag associated with the query object;
combine the initial vector embedding and the tag vector embedding, to produce a combined vector embedding, based on a weighting biased towards the selected modality; and
supply input to the similarity search comprising the combined vector embedding for the query object, to obtain results comprising one or more similar objects represented in the graph.

20. The computing system of claim 19, wherein:
the query object comprises a query image;
the objects comprise existing images represented by nodes in the graph; and
the one or more similar objects represented in the graph comprise nearest neighbors of the query image in the existing images.

* * * * *